(12) United States Patent
Ramani et al.

(10) Patent No.: US 7,394,764 B2
(45) Date of Patent: Jul. 1, 2008

(54) TECHNIQUE FOR IMPROVING TRANSMISSION CONTROL PROTOCOL PERFORMANCE IN LOSSY NETWORKS

(75) Inventors: Rohit Ramani, Bhilai (IN); Abhay Karandikar, Mumbai (IN)

(73) Assignee: Sasken Communication Technologies Limited, Bangalore (IN)

( * ) Notice: Subject to any disclaimer, the term of this patent is extended or adjusted under 35 U.S.C. 154(b) by 1231 days.

(21) Appl. No.: 10/017,642

(22) Filed: Dec. 14, 2001

(65) Prior Publication Data

US 2003/0112754 A1  Jun. 19, 2003

(51) Int. Cl.
*G01R 31/08* (2006.01)
(52) U.S. Cl. ........................................ 370/231; 370/235
(58) Field of Classification Search ................. 370/230, 370/230.1, 231, 235, 236, 389, 392, 401
See application file for complete search history.

(56) References Cited

U.S. PATENT DOCUMENTS

| | | | | |
|---|---|---|---|---|
| 5,719,853 A | * | 2/1998 | Ikeda | 370/229 |
| 5,917,823 A | * | 6/1999 | Benning et al. | 370/397 |
| 5,970,048 A | * | 10/1999 | Pajuvirta et al. | 370/230 |
| 5,974,028 A | * | 10/1999 | Ramakrishnan | 370/229 |
| 6,161,123 A | | 12/2000 | Renouard et al. | 709/203 |
| 6,252,851 B1 | | 6/2001 | Siu et al. | 370/236 |
| 6,587,437 B1 | * | 7/2003 | Lee et al. | 370/236.1 |
| 6,922,390 B1 | * | 7/2005 | Chapman et al. | 370/229 |
| 6,937,600 B2 | * | 8/2005 | Takagi | 370/394 |
| 6,947,446 B2 | * | 9/2005 | LoGalbo et al. | 370/468 |

* cited by examiner

*Primary Examiner*—Huy D. Vu
*Assistant Examiner*—Christine Ng
(74) *Attorney, Agent, or Firm*—Schwegman, Lundberg & Woessner, P.A.

(57) ABSTRACT

The present invention provides an improved transport protocol for lossy networks. This is accomplished by using computationally efficient techniques to manage invoking congestion control mechanisms to control the transmitted packets in lossy networks. The improved transport protocol receives multiple packets including a header and an associated sequence number. The network is monitored for congestion caused by the received packets and marks the header of some of the packets with an impending congestion indication, based on the outcome of the monitoring. The packets are then transmitted, and a receiver then returns acknowledgements of receipt of each of the transmitted packets. Each of the received acknowledgements includes an associated sequence number and any impending congestion indication assigned to the packet. The protocol monitors each of the received acknowledgements, and based on the outcome of the monitoring, invokes a congestion control mechanism to improve the performance of the transport protocol.

36 Claims, 5 Drawing Sheets

TECHNIQUE FOR IMPROVING TRANSMISSION CONTROL PROTOCOL PERFORMANCE IN LOSSY NETWORKS

FIELD OF THE INVENTION

This invention generally relates to transport protocol for communication networks having lossy links, and more particularly to a technique to improve the transport protocol performance in lossy networks including congestion control mechanisms.

BACKGROUND

Most Internet data applications today use reliable transport protocols, such as the transmission control protocol (TCP), which have been tuned for traditional networks comprising wired links and stationary hosts. TCPs assume congestion in the networks to be the primary cause for packet losses (packets can contain thousands of bytes of data) and unusual delays. Congestion occurs when the primary requirements of source(s) exceed the transport capability of a network node. For example, where multiple senders transmit packets to a network node faster than the node can forward the packets the buffer may overflow resulting in congestion, and some of the received packets can be lost. Congestion may also be defined as the condition that exists when the network node buffers occupancy is greater than some threshold.

The TCP protocol controls congestion by utilizing acknowledgements from the receiver and adjusting a sliding window for the sender. The sender will not be able to transmit packets beyond the window size. Upon receiving the acknowledgements from the receiver the window slides ahead and gets incremented. As long as there is no loss, the window size is gradually increased. When a loss occurs, the window size is reduced and then slowly expanded. The sender can identify that a packet has been lost due to congestion either by the arrival of duplicate acknowledgements indicating a loss or by the absence of receiving an acknowledgment within a timeout interval. This entire process of controlling the window size to limit congestion is known as a "congestion control mechanism."

When acknowledgements fail to be received by the sender for reasons other than congestion, however, congestion compensation measures, such as reducing the window size, can result in unnecessary reduction in end-to-end throughput and suboptimal performance. Today Internet and wireless communications links are increasingly being used to transmit data packets in applications such as email, web browsing, mobile computing, and other such applications. Most of these applications make use of reliable end-to-end transport level services provided by TCP. TCP was designed for networks where congestion is the primary cause of packet loss. However, transmission errors over wireless links such as due to fading may often lead to packet loss. Thus, the loss of packet may be due to reasons other than congestion. Wireless links often suffer from sporadic high bit-error rates (BERs) and intermittent connectivity problems due to handoffs. Consequently, TCP performance in networks having wireless links suffers from significant throughput degradation and very high interactive delays due to unnecessary use of congestion compensation mechanisms.

There are currently two approaches to improve TCP performance in such lossy links. A lossy link is a link where packet losses are due to high BERs rather than congestion, such as a wireless link. The first approach hides any non-congestion-related losses from the TCP sender, and therefore requires no changes to the existing sender implementation. The approach assumes that, since the problem is local, it should be solved locally, and that the transport layer need not be aware of the characteristics of the individual links. The lower layers of the network solve this problem by local retransmissions. Protocols adopting this approach attempt to make a lossy link appear to be of a higher quality at the cost of a reduced effective bandwidth. As a result, most of the losses seen by the sender are apparently caused due to congestion, thus reducing performance due to unwarranted invocation of the congestion control mechanism.

The second approach attempts to make the sender aware of the existence of lossy segments, by indicating to the sender that some packet losses are not due to congestion. There are currently two methods using the second approach. The first method uses an end-to-end scheme named EE2E-ELN protocol. This scheme improves TCP performance in lossy networks by making the sender aware of the lossy link. The scheme adds Explicit Loss Notification (ELN) options to TCP acknowledgements. The problem with this scheme is that the Link Layer (LL) is involved in detecting packet losses. This is not desirable because it violates the modular structure of a TCP/IP suite. In addition, adding ELNs to TCP acknowledgements is not yet recommended by the Internet Engineering Task Force (IETF).

The second method uses a scheme, that uses the difference between Round Trip Time (RTT) of the last correctly received packet and the previously received packet, along with notification from the receiver about a packet loss, to determine the cause of the packet loss. The problem with this scheme is that it uses the difference between RTTs to find out reasons for a packet loss. For the scheme to be effective, RTT has to be precisely calculated. Because highly accurate clocks have to be used, it is impractical to implement this scheme in real-time applications. Therefore, there is a need in the art for a technique that improves TCP performance in lossy networks, such as wireless communication networks with congestion compensation mechanisms, that is computationally efficient and practical to implement.

SUMMARY OF THE INVENTION

The present invention provides an apparatus for an improved transport protocol for lossy networks. In one example embodiment, this is accomplished by using computationally efficient techniques to manage invoking congestion control mechanisms to control transmitted packets in lossy networks. The improved apparatus receives multiple packets including a header and an associated sequence number. The apparatus monitors the network for congestion caused by the received packets and marks the header of some of the packets with an impending congestion indication based on the outcome of the monitoring. The packets are then transmitted, and a receiver then sends back acknowledgements of receipt for each of the transmitted packets. Each of the received acknowledgements includes an associated sequence number and any impending congestion indication assigned to the packet. The apparatus monitors each of the received acknowledgements, and invokes a congestion control mechanism based on the outcome of the monitoring to control a congestion window size that regulates the transmitted packets.

Another aspect of the present invention is a method for an improved transport protocol for lossy networks. The method is performed by receiving multiple packets including header and associated sequence number and monitoring the network for congestion caused by the received packets. The header of some of the packets is marked with an impending congestion indication, based on the outcome of the monitoring. The packets are then transmitted and acknowledgements of receipt are returned for each of the transmitted packets. Each of the received acknowledgements includes an associated sequence number and any impending congestion indication assigned to the packet. The method then monitors each of the received acknowledgements, and based on the outcome of the monitoring, invokes a congestion control mechanism to control a congestion window size that regulates the transmitted packets.

Another aspect of the present invention is a computer readable medium having computer-executable instructions for an improved transport protocol for lossy networks. According to the method, multiple packets including header and associated sequence number are received. The method then monitors the network for congestion caused by the received packets, and marks the header of some packet with an impending congestion indication, based on the outcome of the monitoring. The packets are then transmitted and acknowledgements of receipts are received for each of the transmitted packets. Each of the received acknowledgements includes an associated sequence number and any impending congestion indication assigned to the packet. The method then monitors each of the received acknowledgements, and based on the outcome of the monitoring, invokes a congestion control mechanism to control a congestion window size that regulates the transmitted packets. Other aspects of the invention will be apparent on reading the following detailed description of the invention and viewing the drawings that form a part thereof.

DETAILED DESCRIPTION

The present invention provides improved Transport Protocol such as Transmission Control Protocol (TCP) performance in lossy networks, such as wireless communication networks, which is computationally efficient and practical to implement.

Figure 1:
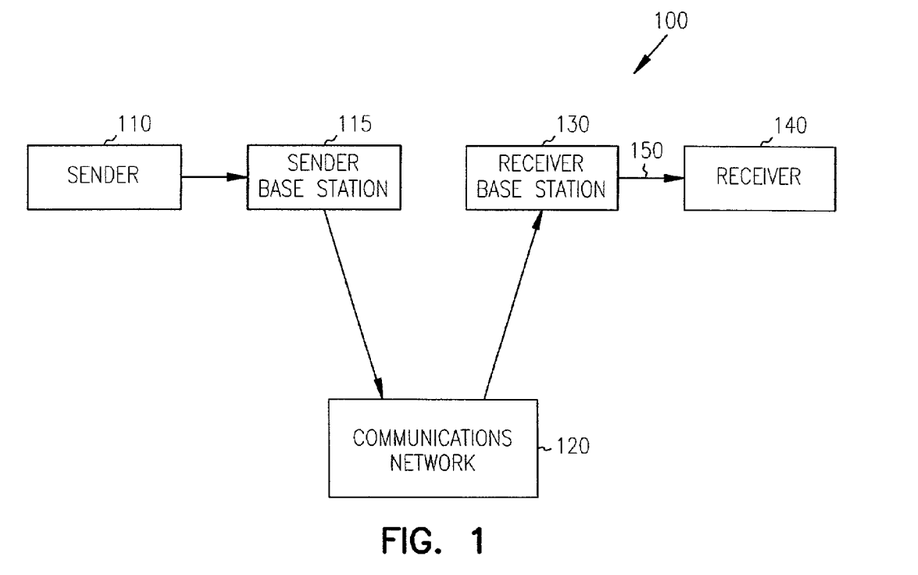
FIG. 1 illustrates an embodiment of a communication system of the present invention.

FIG. 1 shows a communication system according to an embodiment of the present invention. Sender 110 is connected to a sender base station 115, which is connected to a communication network 120. The communication network 120 is connected to receive a base station 130. The receiver base station 130 is connected to receiver 140 over a lossy link 150. The lossy link 150 is a link where transmission losses are primarily due to interference, rather than congestion, such as a wireless link. Sender 110 and receiver 140 transmit and receive information through communication network 120, respectively, through the receiver base station 130 and over the lossy link 150. The term 'information' includes data, text, voice, video, and other such information transmitted over a wireless link. It should be understood that this configuration is shown for simplicity of illustration and that the actual implementation can include many more communication devices, networks, and other such devices. To take advantage of the wireless link 150, receiver 140 can be a mobile receiver such as a laptop computer.

Figure 2:
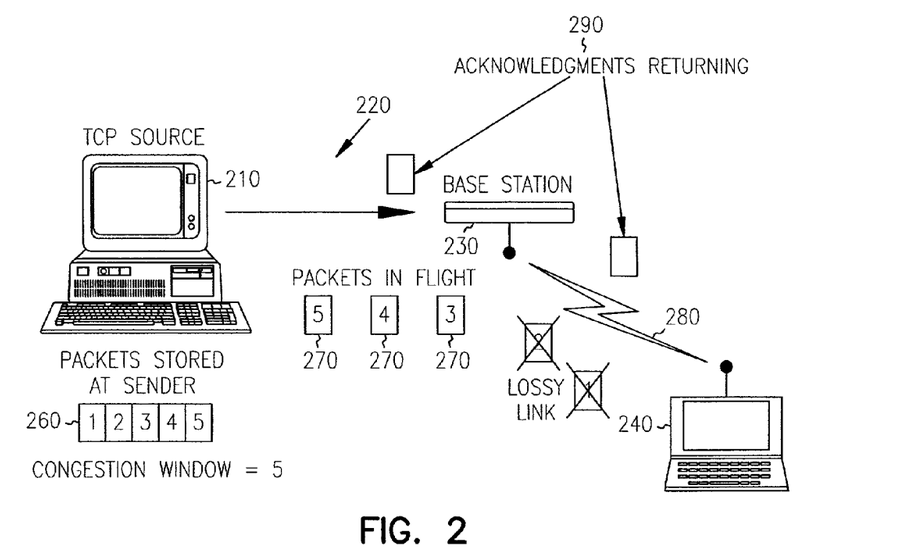
FIG. 2 illustrates an example embodiment of a packet loss situation in a lossy network.

FIG. 2 illustrates an example embodiment of a packet loss situation in a lossy network. Here the TCP source (sender) 210 is in the process of a transfer across a two-hop network 220 including a base station (router) 230 to a TCP receiver (mobile host) 240. At the depicted time, the line at congestion window 260 at the base station 230 includes 5 packets. Of the 5 packets transmitted 270 from the network 220, the first two packets are lost in the wireless link (lossy link) 280 due to wireless errors. Also shown in FIG. 2, is the return of the acknowledgements 290 indicating receipt of the transmitted packets by TCP receiver 240. The acknowledgements include a consecutive sequence number associated with each of the transmitted packets. In the example shown in FIG. 2, TCP receiver 240 has only received packets with sequence numbers 3, 4 and 5 because the first two packets are lost in the lossy link 280. Therefore, in this situation, TCP receiver 240 would return the acknowledgements with the sequence number 0, as it has already received the packet with the sequence number 0, indicating that the packet with sequence number 1 is lost and TCP source 210 should retransmit the packet with the sequence number 1. Only after TCP receiver 240 receives the retransmitted packet with the sequence number 1, it would send the acknowledgement back to TCP source 210 for the packet with the sequence number 1 and so on. It can be seen that TCP receiver 240 sends multiple acknowledgements associated with the sequence number of the last received packet until TCP receiver 240 receives the next transmitted packet.

Figure 3:
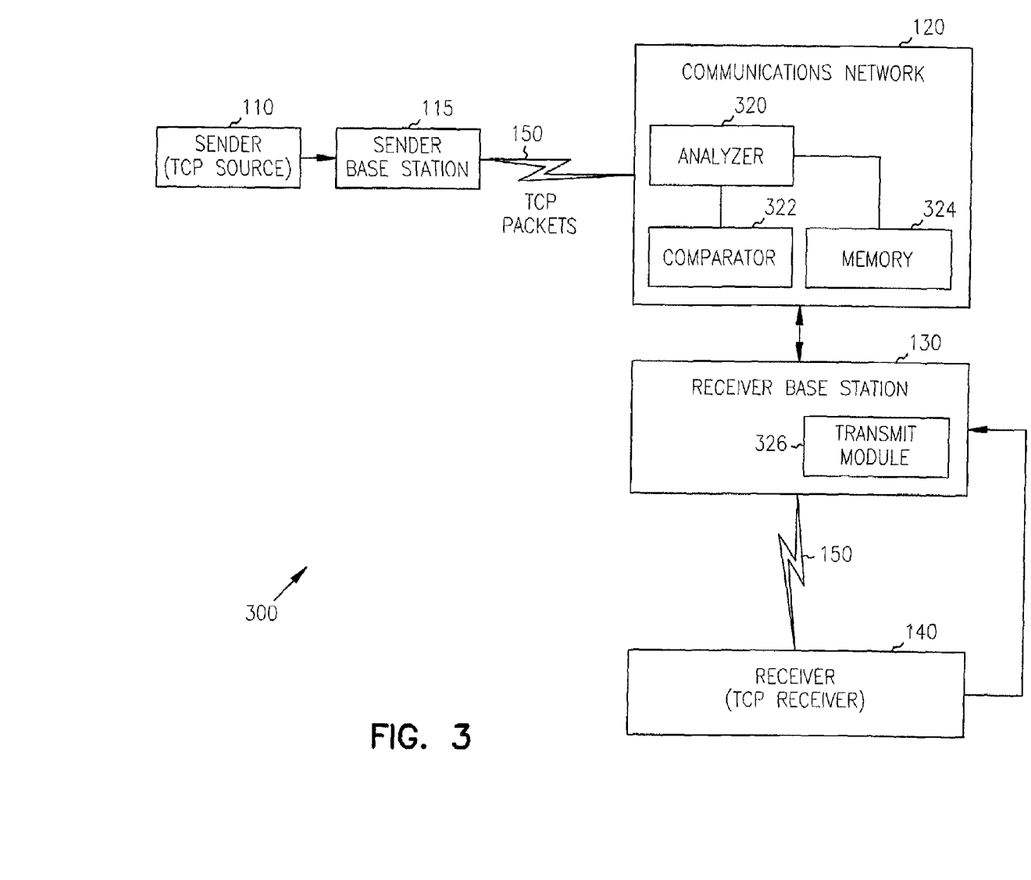
FIG. 3 is an example embodiment of a block diagram of a lossy network including major components of the TCP of the present invention.

FIG. 3 illustrates one embodiment of a block diagram of a lossy network 300 including major components of a TCP of the present invention. The lossy network 300, as shown in FIG. 3, includes sender 110, which is coupled to sender base station 115, which in turn is coupled to the communication network 120. The lossy network 300, as shown in FIG. 3, further includes receiver base station 130 coupled to communication network 130, which is coupled to the receiver 140. In this embodiment, communication network 120 includes an analyzer 320, a comparator 322, and a memory 324.

In operation, sender base station 115 receives multiple packets from a sender 110. Sender 110 can be a transmission control protocol source. Sender base station 115 then transmits the received packets through a lossy network. In this embodiment, the transmitted packets include a header and an associated sequence number. The header can include a congestion alleviation indication. The congestion alleviation indication can be in the form of marking a bit. In some embodiments, marking a bit includes setting to 1 to indicate that a step has been taken to reduce the congestion at the network caused by the transmitted packets. The header can also include an impending congestion indication. The impending congestion indication can be in the form of marking a bit, which can be set to 1 to indicate that the number of packets waiting in a line to be transmitted at sender base station 115 is in-between a predetermined minimum line size and a predetermined maximum line size.

Analyzer 320 then receives the transmitted packets from sender base station 115, and monitors each of the received packets for congestion and marks the header of some received packets with an impending congestion indication based on the outcome of the monitoring. In this embodiment, analyzer 320 monitors a number of received packets waiting in a line to be transmitted at sender base station 115. A comparator 322 then compares the number of received packets waiting in line at the sender base station 115 with predetermined minimum and maximum line sizes. Based on the outcome of comparison by comparator 322, analyzer 320 then marks the header of some of the received packets with the impending congestion indication. In some embodiments, analyzer 320 marks the header of some of the received packets when the number of packets waiting in line is greater than the predetermined minimum line size and less than the predetermined maximum line size based on a predetermined probability with an impending congestion indication. In some embodiments, analyzer 320 drops the packets waiting in the line beyond the predetermined maximum line size when the number of packets waiting in line is greater than the predetermined maximum line size.

In some embodiments, analyzer 320 marks the header of some received packets by flagging bits in the header. Flagging bits in the header can include flagging ECN (Explicit Congestion Notification) flags like CE (Congestion Experienced) bits and CWR (Congestion Window Reduced) bit. Flagging CE bits can include setting CE bits to 1s. Setting CE bits to 1s indicates that the number of packets waiting in a line to be transmitted at sender base station 115 is in between a predetermined minimum line size and a predetermined maximum line size. Flagging a CWR bit can include setting the CWR bit to 1. Setting the CWR bit to 1 indicates that a step has been taken to reduce congestion at the network caused by the transmitted packets. In some embodiments, analyzer 320 provides a forward error correction to the header of each of the packets so that some of the packets that were lost due to wireless errors can be recovered back.

Receiver base station 130 then receives the transmitted packets from the communication network 120 and transmits the received packets through a lossy network 150. Receiver 140 then receives the transmitted packets from the lossy network and then returns acknowledgements to sender 110 through communication network 120 for each of the received packets through receiver base station 130. In this embodiment, the acknowledgements include a sequence number associated with each of the received packets and any associated marked impending congestion indication and congestion alleviation indication. In some embodiments, receiver 140 associates any marked impending congestion indication and congestion alleviation indication by flagging bits in acknowledgements of some of the received packets. Flagging the bits in the acknowledgements can include flagging ECN flags like ECE (ECN-Echo) bit. Flagging an ECE bit can include setting the ECE bit to 1. Setting the ECE bit to 1 indicates that the number of packets waiting in a line to be transmitted at the sender base station 115 is in between a predetermined minimum line size and a predetermined maximum line size, and also that there is no indication that a step has been taken to reduce congestion at the network caused by the transmitted packets which means that flag CWR is set to 0.

Sender 110 then monitors each of the received acknowledgements for the sequence number and for any marked impending congestion indication. Based on the outcome of acknowledgement monitoring, sender 110 invokes a congestion control mechanism to control the transmission of packets to the sender base station 115.

In some embodiments, sender 110 monitors the received acknowledgements for a number of consecutively received acknowledgements with the same sequence number and then further compares the number of consecutively received acknowledgements with the same sequence number with a predetermined number and outputs a first signal when the number of consecutively received acknowledgements with the same sequence numbers is greater than or equal to the predetermined number. Upon receiving the first signal, sender 110 further checks the received acknowledgements for a marked impending congestion indication and invokes a congestion control mechanism when an acknowledgment is marked with a congestion impending indication.

In some embodiments, when a first signal is received and if the monitored acknowledgement is not marked with an impending congestion indication, then the congestion control mechanism is not invoked. In some embodiments, when a first signal is received and the monitored acknowledgement is not marked with an impending congestion indication, then sender 110 reduces the congestion window size by a predetermined small amount to regulate the transmitted packets.

Figure 4:
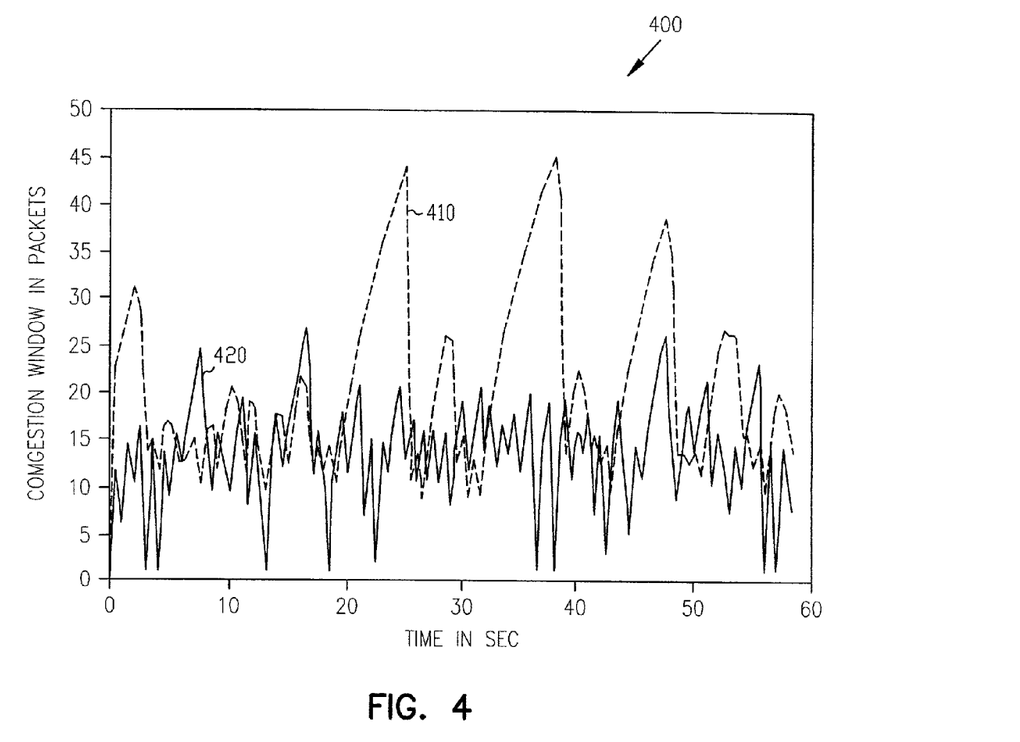
FIG. 4 graphically compares the wireless topology of the prior-art TCP with the TCP of the present invention.

FIG. 4 is a graphical illustration 400 of a variation of TCP window size during a simulation time period of 0-60 seconds for both the prior-art TCP and the improved TCP according to the invention. The TCP congestion window size shown in FIG. 4 is measured in terms of the number of packets in the congestion window. The number of packets in the congestion window is proportional to the number of packets transmitted by sender 110. Therefore, the areas under the dashed line graph 410 and solid line graph 420 are proportional to the number of packets transmitted by sender 110. Graphs 410 and 420 illustrate the number of packets in the congestion window at any given time in the simulation time period when using the improved TCP according to the present invention and the prior-art TCP, respectively. It can be clearly seen that the area under the graph 410 is significantly larger than the area under the graph 420. From these results, it can be concluded that the improved TCP has a higher throughput than the prior-art TCP.

Graphs 410 and 420 were simulated using for a single sender and a single receiver and a network with a buffer capacity of 120 kbits, the data rate of the links set at 2 Mbps, and a propagation delay set at 2 microseconds. The 914 MHz Lucent Wave LAN radio interface was set using a power of transmission at 0.2818W, frequency at 914 MHz, and a receive threshold (the minimum power required to receive a packet at $3.652 \times 10^{-10}$). For the ECN queue, the minimum line size $min_{th}$=96 kbits, the maximum line size $max_{th}$=120 kbits, mean packet size=8 kbits, and the packet marking probability varies between 0 and $max_p$, where $max_p$=0.02. The simulation illustrated in graphs 410 and 420 were performed for 60 seconds.

Figure 5:
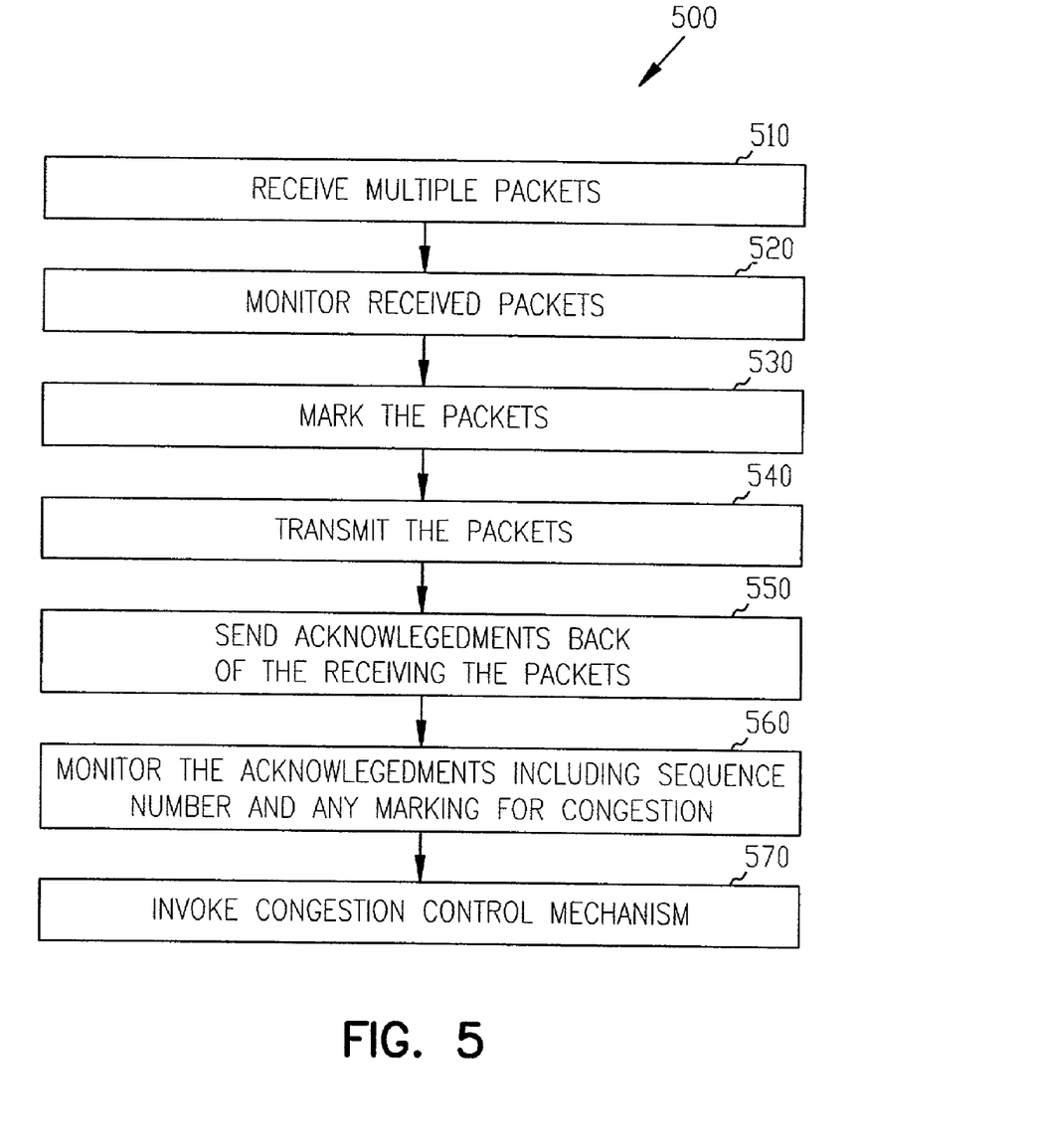
FIG. 5 is a flowchart illustrating the overall operation of the embodiment shown in FIG. 3.

FIG. 5 is a flowchart illustrating one example embodiment of a process 500 of providing a transmission control protocol within a lossy network. The process 500, as illustrated in FIG. 5, controls a congestion window size, which regulates the transmitted packets. The process begins with step 510 by receiving multiple packets, including a header and an associated sequence number. The header can include a congestion alleviation indication. The header can also include an impending congestion indication. Step 520 includes monitoring the network for congestion caused by the received packets. In some embodiments, monitoring the network for congestion further includes monitoring the number of packets waiting in line to be transmitted. Then the number of packets waiting in line is then compared to a predetermined minimum line size and a predetermined maximum line size.

Step 530 includes marking the header of some of the packets with a congestion bit error, based on the outcome of the monitoring. In some embodiments, the header is marked with an impending congestion indication when the number of packets is greater than the predetermined minimum line size and less than the predetermined maximum line size. In some embodiments, marking the impending congestion indication includes flagging CE bits in the header of some of the multiple packets based on a predetermined probability. In some embodiments, when the number of packets waiting in line is greater than the predetermined maximum line size then the packets waiting in line beyond the predetermined maximum line size will be dropped.

Step 540 includes transmitting the monitored packets through a lossy network. Step 550 includes returning acknowledgements after receiving each of the transmitted packets. Each of the transmitted acknowledgements includes a sequence number associated with each of the received packets and any associated impending congestion indication and the congestion alleviation indication. In some embodiments, an associated impending congestion indication and the congestion alleviation indication includes flagging an ECE bit in the acknowledgement of some of the transmitted packet.

Step 560 includes monitoring each of the received acknowledgements for the sequence number and the marked impending congestion indication associated with each of the received packets. In some embodiments, monitoring the received acknowledgements includes monitoring for a number of consecutively received acknowledgements with the same sequence numbers. Monitoring further includes checking the acknowledgements for a marked impending congestion indication when the number of consecutively received acknowledgements with the same sequence number is greater than or equal to a predetermined number. In some embodiments, the predetermined number of consecutive acknowledgements with the same sequence number is 3 or more.

Step 570 includes invoking a congestion control mechanism to control the transmitted packets based on monitoring the acknowledgements and the marked impending congestion indication. In some embodiments, the congestion control mechanism is invoked when the acknowledgment is marked with the impending congestion indication. In some embodiments, a congestion control mechanism is not invoked when the acknowledgement is not marked with an impending congestion indication. In some embodiments, when the acknowledgement is not marked with an impending congestion indication then the congestion window size will be reduced by a predetermined small amount to regulate the transmitted packets.

Method 500, shown in FIG. 5, may be implemented as a sender 110, a sender base station 110, a receiver base station 130, a receiver 140, and a communication network 120 including an analyzer 320, a comparator 322, and a memory 324 as shown in FIG. 3.

Figure 6:
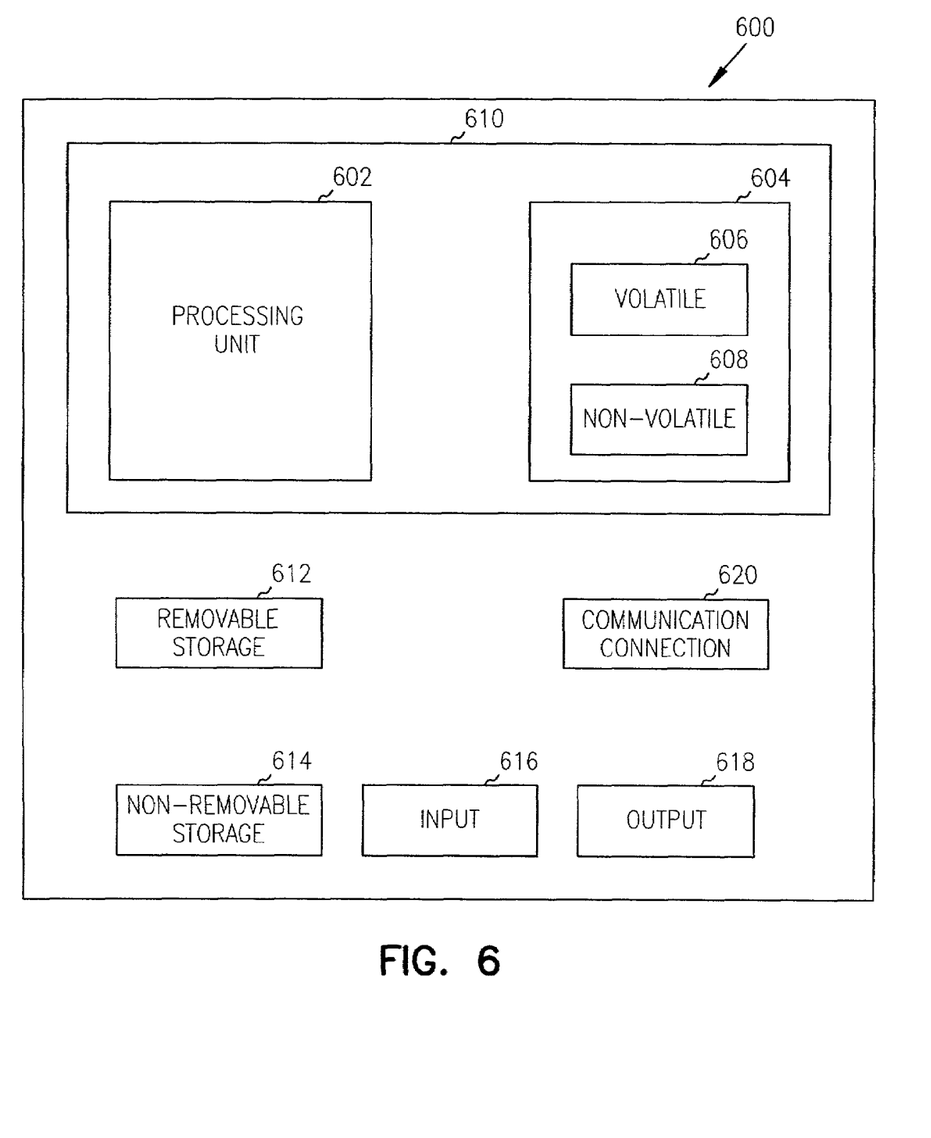
FIG. 6 is a block diagram of a suitable computing system environment for implementing embodiments of the present invention, such as those shown in FIGS. 3 and 5.

FIG. 6 shows an example of a suitable computing system environment 600 for implementing embodiments of the present invention, such as those shown in FIGS. 3 and 5. Various aspects of the present invention are implemented in software, which may be run in the environment shown in FIG. 6 or any other suitable computing environment. The present invention is operable in a number of other general purpose or special purpose computing environments. Some computing environments are personal computers, server computers, hand-held devices, laptop devices, multiprocessors, microprocessors, set top boxes, programmable consumer electronics, network PCs, minicomputers, mainframe computers, distributed computing environments, and the like. The present invention may be implemented in part or in whole as computer-executable instructions, such as program modules that are executed by a computer. Generally, program modules include routines, programs, objects, components, data structures and the like to perform particular tasks or to implement particular abstract data types. In a distributed computing environment, program modules may be located in local or remote storage devices.

FIG. 6 shows a general computing device in the form of a computer 610, which may include a processing unit 602, memory 604, removable storage 612, and non-removable storage 614. Memory 604 may include volatile memory 606 and nonvolatile memory 608. Computer 610 may include— or have access to a computing environment that includes—a variety of computer-readable media, such as volatile memory 606 and non-volatile memory 608, removable storage 612 and non-removable storage 614. Computer storage includes RAM, ROM, EPROM & EEPROM, flash memory or other memory technologies, CD ROM, Digital Versatile Disks (DVD) or other optical disk storage, magnetic cassettes, magnetic tape, magnetic disk storage or other magnetic storage devices, or any other medium capable of storing computer-readable instructions. Computer 610 may include or have access to a computing environment that includes input 616, output 618, and a communication connection 620. The computer may operate in a networked environment using a communication connection to connect to one or more remote computers. The remote computer may include a personal computer, server, router, network PC, a peer device or other common network node, or the like. The communication connection may include a Local Area Network (LAN), a Wide Area Network (WAN) or other networks.

CONCLUSION

The above-described invention provides an improved Transport Protocol performance in lossy networks, such as wireless communication networks. The present invention accomplishes this by using computationally efficient techniques that are practical to implement.

The above description is intended to be illustrative, and not restrictive. Many other embodiments will be apparent to those skilled in the art. The scope of the invention should therefore be determined by the appended claims, along with the full scope of equivalents to which such claims are entitled.

What is claimed is:

1. A method for providing a transport protocol within a lossy network, comprising:
   receiving multiple packets, wherein each of the received packets includes a header and an associated sequence number, wherein the header includes a congestion alleviation indication and an impending congestion indication;
   monitoring the network for congestion caused by the received packets;
   marking the header of some of the packets with an impending congestion indication based on the outcome of the monitoring;
   transmitting the monitored multiple packets through the lossy network;
   returning acknowledgements of receipt for each of the transmitted packets, based on the sequence number associated with each of the packets, and any associated marked impending congestion indication and the congestion alleviation indication;
   monitoring each of the received acknowledgements for the sequence number and the marked impending congestion indication associated with each of the received packets; and
   invoking a congestion control mechanism to control a congestion window size which regulates the transmitted packets based on the monitoring of the acknowledgements and the marked impending congestion indication, and further marking the header with a congestion alleviation indication.

2. The method of claim 1, wherein monitoring the network for congestion, comprises:
   monitoring the number of packets waiting in line to be transmitted; and
   comparing the number of packets waiting in line to a predetermined minimum line size and a predetermined maximum line size.

3. The method of claim 2, wherein marking the header of some of the packets with an impending congestion indication, comprises:
   if the number of packets waiting in line is greater than the predetermined minimum line size and less than the predetermined maximum line size, then marking the header of some of the received packets based on a predetermined probability with an impending congestion indication; and
   if the number of packets waiting in line is greater than the predetermined maximum line size, then the packets waiting in line beyond the predetermined maximum line size will be dropped.

4. The method of claim 3, wherein monitoring each acknowledgement for the sequence number and the marked impending congestion indication, comprises:
   monitoring acknowledgements for a number of consecutively received same sequence numbers; and
   if the number of consecutively received acknowledgements with the same sequence number is greater than or equal to a predetermined number, then checking the acknowledgements for a marked impending congestion indication.

5. The method of claim 4, wherein invoking a congestion control mechanism, compnses:
   if the acknowledgement is marked with an impending congestion indication, then invoking the congestion control mechanism.

6. The method of claim 5, further comprising:
   if the acknowledgement is not marked with an impending congestion indication, then the congestion control mechanism will not be invoked.

7. The method of claim 4, further comprising:
   if the acknowledgement is not marked with an impending congestion indication then the congestion window size will be reduced by a predetermined small amount to regulate the transmitted packets.

8. The method of claim 1, further comprising:
   providing a forward error correction to the header of each packet.

9. The method of claim 1, wherein marking the header of some of the multiple packets with an impending congestion indication, comprises:
   flagging CE (Congestion Experienced) bits in the header of some of the multiple packets; and
   flagging a CWR (Congestion Window Reduced) bit in the header of some of the multiple packets.

10. The method of claim 9, wherein returning acknowledgements comprise: flagging an ECE (Explicit Congestion Notification Echo) bit in the acknowledgements.

11. The method of claim 4, wherein the predetermined number is 3 or more consecutive acknowledgements including a same sequence number.

12. A computer-readable medium having computer-executable instructions for providing a transport protocol within a lossy network, comprising:
   receiving multiple packets, wherein each of the received packets includes a header and an associated sequence number, wherein the header includes a congestion alleviation indication and an impending congestion indication;
   monitoring the network for congestion caused by the received packets;
   marking the header of some of the packets with an impending congestion indication based on the outcome of the monitoring;
   transmitting the monitored multiple packets through the lossy network;
   returning acknowledgements of receipt for each of the transmitted packets, based on the sequence number associated with each of the packets, and any associated marked impending congestion indication and the congestion alleviation indication;
   monitoring each of the received acknowledgements for the sequence number and the marked impending congestion indication associated with each of the received packets; and
   invoking a congestion control mechanism to control a congestion window size which regulates the transmitted packets based on the monitoring of the acknowledgements and the marked impending congestion indication, and further marking the header with a congestion alleviation indication.

13. The computer-readable medium of claim 12, wherein monitoring the network for congestion, compnses:
   monitoring the number of packets waiting in line to be transmitted; and
   comparing the number of packets waiting in line to a predetermined minimum line size and a predetermined maximum line size.

14. The computer-readable medium of claim 13, wherein marking the header of some of the packets with an impending congestion indication, comprises:
   if the number of packets waiting in line is greater than the predetermined minimum line size and less than the predetermined maximum line size, then marking the header of some of the received packets based on a predetermined probability with an impending congestion indication; and
   if the number of packets waiting in line is greater than the predetermined maximum line size, then the packets waiting in line beyond the predetermined maximum line size will be dropped.

15. The computer-readable medium of claim 14, wherein monitoring each acknowledgement for the sequence number and the marked impending congestion indication, comprises:
   monitoring acknowledgements for a number of consecutively received same sequence numbers; and
   if the number of consecutively received acknowledgements with the same sequence number is greater than or equal to a predetermined number, then checking the acknowledgements for a marked impending congestion indication.

16. The computer-readable medium of claim 15, wherein invoking a congestion control mechanism, comprises:
   if the acknowledgement is marked with an impending congestion indication, then invoking the congestion control mechanism.

17. The computer-readable medium of claim 16, further comprising:
   if the acknowledgement is not marked with an impending congestion indication, then the congestion control mechanism will not be invoked.

18. The computer-readable medium of claim 15, further comprising:
    if the acknowledgement is not marked with an impending congestion indication, then the congestion window size will be reduced by a predetermined small amount to regulate the transmitted packets.

19. A computer system for providing a transport protocol within a lossy network, comprising:
    a storage device;
    an output device; and
    a moduel for receiving multiple packets, wherein each of the received packets includes a header and an associated sequence number, wherein the header includes a congestion alleviation indication and an impending congestion indication;
    a module for monitoring the network for congestion caused by the received packets;
    a module for marking the header of some of the packets with an impending congestion indication based on the outcome of the monitoring;
    a module for transmitting the monitored multiple packets though the lossy network; returning acknowledgements of receipt for each of the transmitted packets, based on the sequence number associated with each of the packets, and any associated marked impending congestion indication and the congestion alleviation indication;
    a module for monitoring each of the received acknowledgements for the sequence number and the marked impending congestion indication associated with each of the received packets; and
    a module for invoking a congestion control mechanism to control a congestion window size which regulates the transmitted packets based on the monitoring of the acknowledgements and the marked impending congestion indication, and marking the header further with congestion alleviation indication.

20. The system of claim 19, wherein monitoring the network for congestion, comprises:
    monitoring the number of packets waiting in line to be transmitted; and
    comparing the number of packets waiting in line to a predetermined minimum line size and a predetermined maximum line size.

21. The system of claim 20, wherein marking the header of some of the packets with an impending congestion indication, comprises:
    if the number of packets waiting in line is greater than the predetermined minimum line size and less than the predetermined maximum line size, then marking the header of some of the received packets based on a predetermined probability with an impending congestion indication; and
    if the number of packets waiting in line is greater than the predetermined maximum line size, then the packets waiting in line beyond the predetermined maximum line size will be dropped.

22. The system of claim 21, wherein monitoring each of the acknowledgements for the sequence number and the marked impending congestion indication, comprises:
    monitoring acknowledgements for a number of consecutively received same sequence numbers; and
    if the number of consecutively received acknowledgements with the same sequence number is greater than or equal to a predetermined number, then checking the acknowledgements for a marked impending congestion indication.

23. The system of claim 22, wherein invoking a congestion control mechanism, compnses:
    if the acknowledgement is marked with an impending congestion indication, then invoking the congestion control mechanism.

24. The system of claim 23, further comprising:
    if the acknowledgement is not marked with an impending congestion indication, then the congestion control mechanism will not be invoked.

25. The system of claim 22, further comprising:
    if the acknowledgement is not marked with an impending congestion indication then the congestion window size will be reduced by a predetermined small amount to regulate the transmitted packets.

26. An apparatus for providing a transport protocol within a iossy network, comprising:
    a sender base station to receive multiple packets from a sender and output the packets through a lossy network, wherein each of the received packets includes a header and an associated sequence number, wherein the header includes a congestion alleviation indication and an impending congestion indication;
    a communication network including an analyzer to receive the outputted packets and monitor the network for congestion caused by the received packets and to further mark the header of some of the received packets with an impending congestion indication based on an outcome of the monitoring;
    a receiver base station including a transmit module to transmit the packets through the lossy network; and
    a receiver to receive the transmitted packets and to further send acknowledgements back to the sender through the communication network, wherein the acknowledgements include a sequence number associated with each of the received packets and any associated marked impending congestion indication and the congestion alleviation indication, wherein the sender monitors each of the received acknowledgements for the sequence number and the marked impending congestion indication associated with each of the received packets, and invokes a congestion control mechanism to control a congestion window size which regulates the transmitted packets based on the monitoring of the acknowledgements and the marked impending congestion indication, and further marks the header with congestion alleviation indication.

27. The apparatus of claim 26, wherein the analyzer further monitors a number of packets waiting in a line transmitted by the sender base station.

28. The apparatus of claim 26, wherein the analyzer further comprises a comparator to compare the number of received packets waiting in line with a predetermined minimum line size and a predetermined maximum line size, wherein the analyzer marks the header of some of the received packets with the impending congestion indication, based on the outcome of the comparison.

29. The apparatus of claim 28, wherein the analyzer marks the header of some of the received packets when the number of packets waiting in line is greater than the predetermined minimum line size and less than the predetermined maximum line size based on a predetermined probability with an impending congestion indication; and
    if the number of packets waiting in line is greater than the predetermined maximum line size, then the packets waiting in line beyond the predetermined maximum line size will be dropped.

30. The apparatus of claim 29, wherein the sender monitors the received acknowledgements for a number of consecutively received acknowledgements with the same sequence number and further compares the consecutively received acknowledgements with the same sequence number with a predetermined number and outputs a first signal when the number of consecutively received acknowledgements with the same sequence number is greater than or equal to the predetermined number, and upon receiving the first signal further checks the received acknowledgements for a marked impending congestion indication,    wherein the sender invokes a congestion control mechanism when the acknowledgement is marked with the marked impending congestion indication.

31. The apparatus of claim 30, wherein after receiving the first signal, the sender does not invoke the congestion control mechanism when the acknowledgement is not marked with the impending congestion indication.

32. The apparatus of claim 30, wherein after receiving the first signal, the sender reduces the congestion window size by a predetermined small amount to regulate the transmitted packets when the acknowledgement is not marked with an impending congestion indication.

33. The apparatus of claim 26, wherein the sender further provides a forward error correction to the header of each packet.

34. The apparatus of claim 26, wherein the analyzer marking the header comprises flagging CE bits in the header.

35. The apparatus of claim 26, wherein the sender marking the header comprises flagging a CWIR bit in the header.

36. The apparatus of claim 26, wherein the receiver marking the acknowledgement comprises flagging an BCE bit in the acknowledgement.

\* \* \* \* \*

UNITED STATES PATENT AND TRADEMARK OFFICE
CERTIFICATE OF CORRECTION

PATENT NO. : 7,394,764 B2  Page 1 of 1
APPLICATION NO. : 10/017642
DATED : July 1, 2008
INVENTOR(S) : Ramani et al.

It is certified that error appears in the above-identified patent and that said Letters Patent is hereby corrected as shown below:

In column 9, line 35, in Claim 5, delete "compnses:" and insert -- comprises: --, therefor.

In column 10, line 29, in Claim 13, delete "compnses:" and insert -- comprises: --, therefor.

In column 11, line 11, in Claim 19, delete "moduel" and insert -- module --, therefor.

In column 11, line 23, in Claim 19, delete "though" and insert -- through --, therefor.

In column 11, line 23, in Claim 19, after "network;" insert -- a module for --.

In column 12, line 2, in Claim 23, delete "compnses:" and insert -- comprises: --, therefor.

In column 12, line 16, in Claim 26, delete "iossy" and insert -- lossy --, therefor.

In column 14, line 13, in Claim 35, delete "CWIR" and insert -- CWR --, therefor.

In column 14, line 15, in Claim 36, delete "BCE" and insert -- ECE --, therefor.

Signed and Sealed this

Eleventh Day of November, 2008

JON W. DUDAS
*Director of the United States Patent and Trademark Office*